US007782475B2

(12) United States Patent
Tsuchiya et al.

(10) Patent No.: US 7,782,475 B2
(45) Date of Patent: Aug. 24, 2010

(54) DEVICE MANAGEMENT APPARATUS AND DEVICE MANAGEMENT METHOD

(75) Inventors: Yuichi Tsuchiya, Nagano (JP); Hiroaki Hayashi, Nagano (JP); Tomohiro Kodama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1104 days.

(21) Appl. No.: 11/170,089

(22) Filed: Jun. 30, 2005

(65) Prior Publication Data

US 2006/0066896 A1 Mar. 30, 2006

(30) Foreign Application Priority Data

Sep. 28, 2004 (JP) ............................ P2004-281556
May 2, 2005 (JP) ............................ P2005-133884

(51) Int. Cl.
*G06F 3/12* (2006.01)

(52) U.S. Cl. ........................ 358/1.15; 340/540; 358/1.1; 399/8; 399/79; 710/19; 719/321; 702/188

(58) Field of Classification Search ................. 358/1.15
See application file for complete search history.

(56) References Cited

U.S. PATENT DOCUMENTS

| 3,704,363 | A | | 11/1972 | Salmassy et al. | |
|---|---|---|---|---|---|
| 6,076,050 | A | * | 6/2000 | Klein | ........................ 702/188 |
| 6,108,714 | A | | 8/2000 | Kumagai et al. | |
| 6,366,741 | B1 | * | 4/2002 | Fukushima | ..................... 399/8 |
| 6,606,162 | B1 | * | 8/2003 | Simpson | ..................... 358/1.15 |
| 6,631,247 | B1 | * | 10/2003 | Motoyama et al. | ............. 399/8 |
| 2002/0089684 | A1 | * | 7/2002 | Barry et al. | ................. 358/1.14 |
| 2002/0095310 | A1 | | 7/2002 | Kobayashi et al. | |
| 2002/0151321 | A1 | * | 10/2002 | Winchell et al. | ............ 455/519 |
| 2002/0163666 | A1 | * | 11/2002 | Iwata et al. | ................. 358/1.15 |
| 2002/0174420 | A1 | * | 11/2002 | Kumar | ........................ 717/174 |
| 2003/0028753 | A1 | * | 2/2003 | Ohishi | ........................ 712/205 |
| 2003/0030842 | A1 | * | 2/2003 | Suyehira | .................... 358/1.15 |
| 2003/0061324 | A1 | | 3/2003 | Atherton et al. | |
| 2003/0195917 | A1 | * | 10/2003 | Horiyama et al. | ........... 709/102 |
| 2004/0021893 | A1 | * | 2/2004 | Stevens et al. | ............. 358/1.15 |
| 2004/0190917 | A1 | * | 9/2004 | Holzner | ........................ 399/24 |

FOREIGN PATENT DOCUMENTS

| EP | 1 069 741 A1 | 1/2001 |
|---|---|---|
| JP | 9-6582 | 1/1997 |
| JP | 2002-207690 | 7/2002 |
| WO | WO 2004/031951 A2 | 4/2004 |

* cited by examiner

*Primary Examiner*—King Y Poon
*Assistant Examiner*—David S Cammack
(74) *Attorney, Agent, or Firm*—Nixon & Vanderhye P.C.

(57) ABSTRACT

A device management apparatus is adapted to be connected to devices which constitute at least one device group. An application is running in the device management apparatus. Each of the device managers is associated with one of the devices and is operable to create usage information of the associated one of the devices. A device group manager is associated with the at least one device group and coupled to the device managers to receive the usage information from each of the device managers. The device group manager is operable to notify the usage information in response to an inquiry from the application.

8 Claims, 5 Drawing Sheets

DEVICE MANAGEMENT APPARATUS AND DEVICE MANAGEMENT METHOD

BACKGROUND OF THE INVENTION

The present invention relates to technology for managing a plurality of parallel operating devices, and relates more particularly to technology for managing a plurality of devices in groups.

JAVA POS is an application programming interfacing for building point-of-sale (POS) systems using JAVA (registered trademark). JAVA POS also has a function for using device statistics, that is, information relating to usage of devices connected to a POS terminal. The JAVA POS standard enables an application running on a POS terminal to acquire and use these device statistics for example as device usage information. This usage information is information indicating usage of particular device functions, and in the case of a printer is information relating to the number of lines printed or the number of characters printed, for example.

The device statistics are individually managed in each of several individual devices, including, for example, a printer, a magnetic ink character reader (MICR), a scanner, and a cash drawer.

There are also hybrid apparatuses having a printer, an MICR, and a scanner, for example, in a single housing. In addition to the usage statistics that are kept for each of the component devices in this type of hybrid device, usage information for the hybrid device as a whole may also be needed. However, while statistics such as the operating time can be acquired for the individual component devices in a hybrid device according to the prior art, determining the total continuous operating time of the hybrid apparatus in toto is not possible.

In addition to managing device statistics by individual device or the hybrid device overall, grouping two or more devices together and maintaining the device statistics by device group may also be desirable.

SUMMARY OF THE INVENTION

It is therefore an object of the present invention to manage the device statistics while associating two or more devices with each other.

In order to achieve the above object, according to the invention, there is provided a device management apparatus adapted to be connected to a plurality of devices which constitute at least one device group, comprising:

an application running in the device management apparatus;

a plurality of device managers, each of which is associated with one of the devices and is operable to create usage information of the associated one of the devices; and a device group manager, associated with the device group and coupled to the device managers to receive the usage information from each of the device managers, the device group manager being operable to notify the usage information in response to an inquiry from the application.

Preferably, the device management apparatus further comprises a plurality of device drivers, each of which is associated with one of the devices to drive the associated one of the devices. One of the device managers creates the usage information when the application instructs the one of the device drivers to drive one of the devices.

Here, it is preferable that the device management apparatus further comprises:

a storage component, storing device group information defining the device group; and a creator component, which refers, when one of the device drivers is activated, the device group information to specify a device group including one of the devices associated with the activated one of the device drivers, and which dynamically creates a device group manager if no device group manager is associated with the specified device group.

Preferably, the device management apparatus is adapted to be connected to at least one hybrid device including at least two of the devices. The usage information includes information pertaining to each of the at least two devices and information pertaining to the hybrid device.

The device management apparatus may additionally include a multi-group device group manager associated with device managers of individual devices associated with different device groups. Correlations between the device managers and the devices may be dynamically generated. Virtual counters may be associated with the plurality of devices that communicate with the device managers to create the usage information based on predicted usage counts. In this context, the apparatus may additionally include a cumulative counter that accumulates the predicted usage counts for each of the devices According to the invention, there is also provided a device management method, comprising:

connecting a device management apparatus to a plurality of devices which constitute at least one device group;

running an application in the device management apparatus;

obtaining usage information of one of the devices; and notifying the obtained usage information in response to an inquiry from the application.

Preferably, the device management method further comprises providing a plurality of device drivers, each of which is associated with one of the devices to drive the associated one of the devices. The usage information is created when the application instructs the one of the device drivers to drive one of the devices.

Here, it is preferable that the device management method further comprises:

storing device group information defining the at least one device group;

referring, when one of the device drivers is activated, the device group information to specify a device group including one of the devices associated with the activated one of the device drivers; and if no device group manager is associated with the specified device group, creating dynamically a device group manager for notifying the usage information to the application.

According to the invention, there is also provided a device management apparatus, comprising:

a general purpose computer having a processor and a memory, the general purpose computer communicating with the devices and running a management application;

a plurality of device managers, each of which is associated with one of the devices and is operable to create usage information of the associated one of the devices; and a device group manager, associated with the at least one device group and coupled to the device managers to receive the usage information from each of the device managers, the device group manager being operable to notify the usage information in response to an inquiry from the application.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Embodiments of the present invention will be described below in detail with reference to the accompanying drawings.

Figure 1:
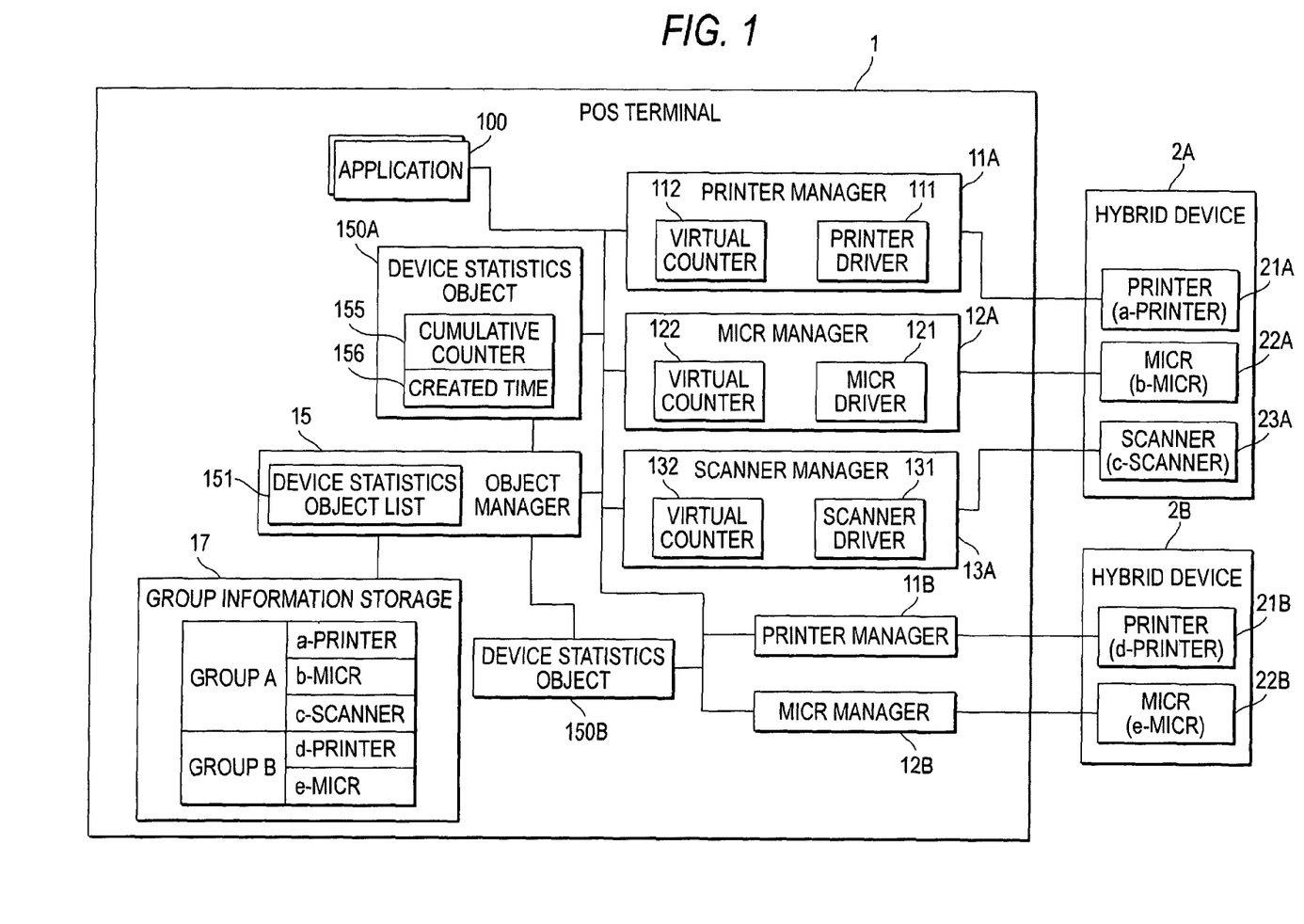
FIG. 1 is a block diagram of a POS system according to one embodiment of the present invention.

As shown in FIG. 1, a POS system according to one embodiment of the invention has a POS terminal 1 and at least one hybrid device. In this embodiment, two hybrid devices 2A and 2B are connected to the POS terminal 1. The hybrid device 2A has a printer (a-printer) 21A, a MICR (b-MICR) 22A, and a scanner (c-scanner) 23A, and hybrid device 2B has a printer (d-printer) 21 B and MICR (e-MICR) 22B.

These hybrid devices are merely shown by way of example, and the devices (device categories) that are included in the hybrid devices may vary as needed.

The POS terminal 1 is built using a general purpose computer having a processor and a memory, and the components and functions of the POS terminal 1 described below can be achieved by running a computer program in the POS terminal 1.

The POS terminal 1 has printer managers 11 (11A, 11B), MICR managers 12 (12A, 12B), a scanner manager 13 (13A), an object manager 15, a group information storage 17, and at least one application 100.

The printer managers 11, MICR managers 12, and scanner manager 13 for managing each of the devices in the hybrid devices 2 are also collectively referred to herein as device managers. Each device manager manages usage information for the respective managed devices.

The group information storage 17 stores group information related to groups of plural devices. For example, the group information storage 17 stores group names linked to identification information for each device in a group. In the example shown in FIG. 1, the printer 21A, MICR 22A, and scanner 23A housed in the case of hybrid device 2A form a device group A, and the printer 21 B and MICR 22B housed in the case of hybrid device 2B form a device group B.

These groupings are merely shown by way of example, and a particular application 100 could be used to desirably set and change the group information stored in the group information storage 17. More specifically, a desired combination of devices can be defined as a group, usage information can be managed by group unit, and devices that are part of different hybrid devices 2 can be combined in the same group.

The object manager 15 generates and manages the data statistics (DS) objects 150 (150A, 150B). The data statistics objects 150 are objects for gathering and managing the usage information related to data statistics in the JAVA POS specification. One data statistics object 150, for example, manages virtual usage information for each device based on the groups defined by the group information storage 17, and returns the virtual usage information for the devices belonging to a requested group. This virtual usage information is calculated by virtual counters 112, 122, and 132 as described in further detail below.

The data statistics objects 150 can be dynamically generated as needed and deleted when no longer necessary. In this arrangement the object manager 15 also maintains a data statistics object list 151. When a data statistics object 150 is then generated, the object name and other identification information is added to the data statistics object list 151, and deleted when the object 150 is deleted.

The data statistics objects 150 can also be provided for individual groups. For example, when a request is received from the printer managers 11, the MICR managers 12, or the scanner manager 13, the object manager 15 references the group information storage 17 to find the group containing the devices 21, 22, 23 associated with the manager 11, 12, or 13 that sent the request, and then creates a data statistics object 150 for that group. In the example shown in FIG. 1, data statistics object 150A manages the group A, and data statistics object 150B manages the group B. The name of the data statistics object 150 is preferably set so that the group managed by the data statistics object 150 can be identified from the object name.

The printer manager 11A, the MICR manager 12A, and the scanner manager 13A are respectively linked to and manage the printer 21A, the MICR 22A, and the scanner 23A of the hybrid device 2A. The printer manager 11B and the MICR manager 12B are likewise respectively linked to and manage the printer 21B and the MICR 22B of the hybrid device 2B. These correlations of managers and devices can also be dynamically generated. If the printer manager 11A acquires identification information from the printer 21A when the printer manager 11A is activated or created, for example, the printer manager 11A is configured to manage the printer 21A identified by the received identification information.

The printer managers 11, the MICR managers 12, and the scanner manager 13 respectively comprise a printer driver 111, a MICR driver 121, a scanner driver 131 for driving the related device, and a virtual counter 112, 122, 132. Note that the internal driver and the virtual counter are not shown in the printer manager 11B and the MICR manager 12B in FIG. 1. Note that processors belonging to group A are primarily described below, and that processors belonging to group B are the same.

The printer driver 111 receives print requests and other commands from the application 100 and drives the printer 21A based on the received commands. The MICR driver 121 and the scanner driver 131 likewise drive the MICR 22A and the scanner 23A according to requests from the application 100.

When the printer driver 111 drives the printer 21A according to a request from the application 100, the virtual counter 112 predicts the expected printer usage, that is, how much the printer 21A is used when driven. More particularly, when the printer driver 111 drives the printer 21A to print, the virtual counter 112 predicts the number of characters or lines printed by the printer 21A, how much paper is consumed (the paper transportation distance if using a rolled sheet, and how many sheets if using cut sheets), and how many times the rolled sheet is cut. The predicted counts are then reported to the data statistics object 150A.

The virtual counters 122 and 132 run processes similar to that of the virtual counter 112. More particularly, the virtual counters 122 and 132 predict the counts for predefined usage parameters indicating how much the MICR 22A and the scanner 23A are used when driven by the MICR driver 121 and the scanner driver 131, and send these counts to the data statistics object 150A.

Predicting usage information for different functions of the printer 21A based on commands sent by the virtual counter 112 to the printer 21A is described below by way of example.

(1) If the command is a text printing command, the virtual counter 112 predicts the number of characters and lines printed by the printer 21A by counting the number of characters and line returns specified by the parameters of the print command.

(2) If the print command is a barcode print command, the virtual counter 112 counts the number of dots printed by the printer 21A to print the image data contained in the barcode print command, and converts this dot count to the equivalent number of characters in a specified font. For example, the number of dots per character used for this conversion could be the number of dots in the font size most frequently printed on the printer 21A (such as 12 dots wide by 24 dots tall), or the average number of dots in one character.

Image data print commands also contain image size and scaling information. The virtual counter 112 could thus use this information to determine the height of the image when printed by the printer 21A, and predict the number of lines printed based on the calculated image height and the predetermined height (line feed distance) of one line.

(3) The virtual counter 112 also detects escape sequence control commands to predict printer usage. The virtual counter 112 could, for example, count the number of times the paper is cut based on the number of times a paper cut command is sent, and count the number of paper cut escape sequences contained in the print command.

The virtual counter 112 also counts the actual number of times the printer 21A executes commands corresponding to barcode printing, slip insertion, and reversing the paper (changing the side that is printed). The number of home position errors can also be represented by a mechanical error count.

If the individual devices 21A, 22A, 23A have internal counters for counting device usage, the virtual counters 112, 122, 132 of the device manager can be omitted. In this arrangement device usage is monitored by reading the internal counters of the individual devices, and the counter readings can be reported to the data statistics object 150.

The data statistics object 150A also has a cumulative counter 155. The cumulative counter 155 accumulates the predicted usage counts (values) for each of the devices 21A, 22A, 23A belonging to the group A. A cumulative counter 155 is provided for each device category and counted parameter. The data statistics object 150A also stores the creation time 156 denoting when the data statistics object 150A is created.

If a read request is then received from the application 100, the cumulative counter 155 returns the internally stored cumulative count. These read requests could retrieve all parameters for all devices, parameters for a particular device category, or a specific parameter for a specific device. If the data statistics object 150A is requested for the time elapsed since the data statistics object 150A is created, the data statistics object 150A calculates and returns the time elapsed since the data statistics object 150A is created.

Note that like data statistics object 150A, data statistics object 150B also has a cumulative counter and stores the creation time, and has the same functions as the data statistics object 150A.

Operation of the foregoing system according to this embodiment of the invention is described below with reference to the flow charts in FIGS. 2 to 4.

Figure 2:
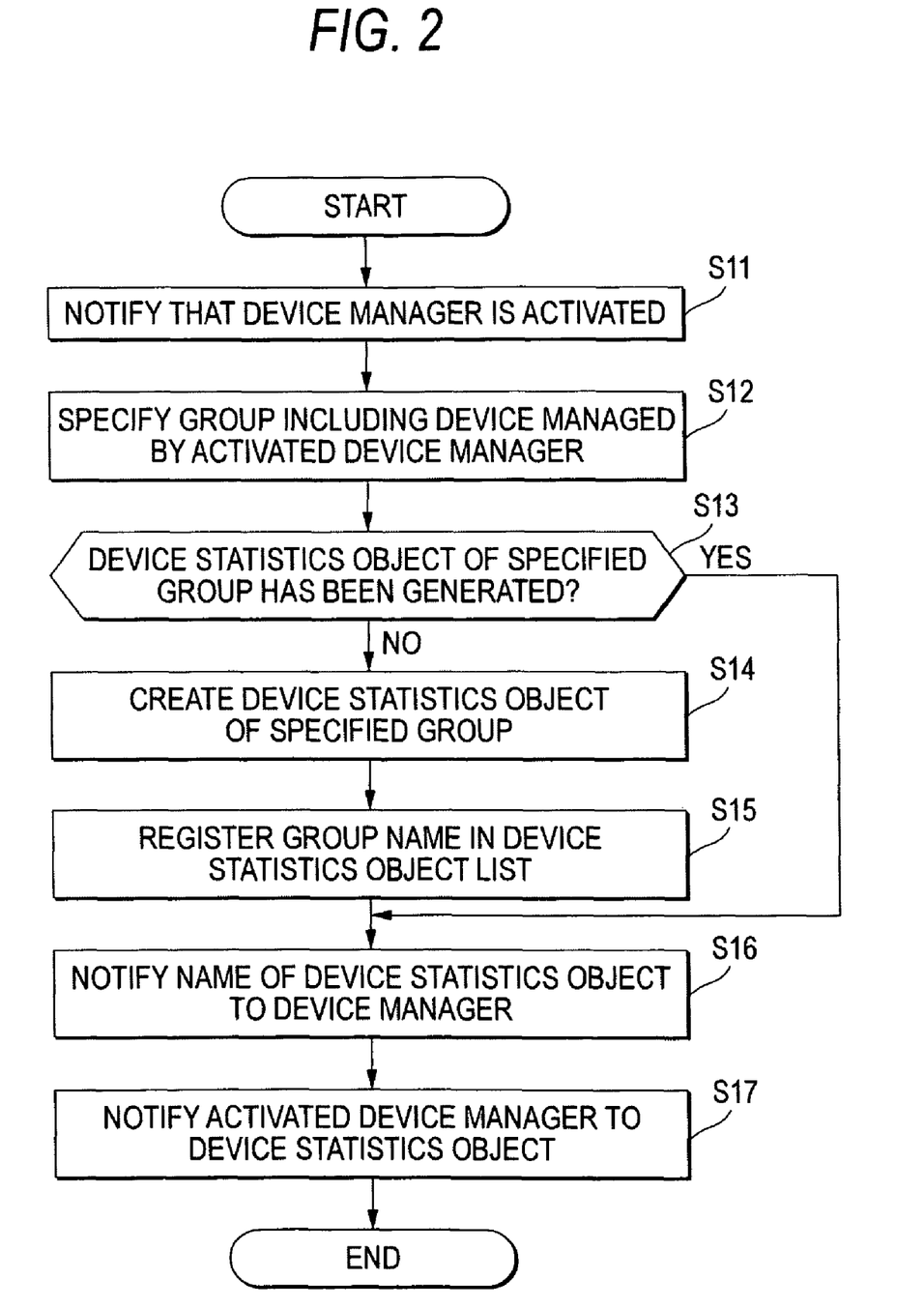
FIG. 2 is a flow chart of a process for creating a data statistics object executed in the POS system of FIG. 1.

FIG. 2 is a flow chart of the process of creating a data statistics object. When any one of the device managers, that is, the printer manager 11A, the MICR manager 12A, or the scanner manager 13A, is activated, the object manager 15 receives a report from the activated device manager (S11). This example assumes that the printer manager 11A is activated.

The report sent in step S11 contains identification information (a-printer) for the device (printer 21A in this example) linked to the activated printer manager 11A. Based on identification information (a-printer) for the reported device, the object manager 15 references the group information storage 17 to find the group containing the identified device (S12). Group A is thus identified in this example.

The object manager 15 then references the data statistics object list 151 to determine if a data statistics object 150A for managing the identified group A already exists (S13).

If the corresponding data statistics object 150A has not been created (NO in S13), the object manager 15 creates the data statistics object 150A, assigns a group name identifying the object as a data statistics object for group A, and registers the group name in the data statistics object list 151 (S14, S15).

If the corresponding data statistics object 150A has already been created (YES in S13), steps S14 and S15 are skipped.

The data statistics object name for group A is then returned to the printer manager 11A that reported being activated (S16). The data statistics object 150A is also informed that the printer manager 11A is active by reporting the identification information for the printer 21A, for example (S17), thus completing a two-way relationship between the data statistics object 150A and the activated device manager, i.e., printer manager 11A.

The process run by the device manager will be described with reference to the flow chart in FIG. 3. The printer 21A and the printer manager 11A are used by way of example below, and other devices and device managers operate in the same way.

This process starts when the printer manager 11A receives a specific print command sent from the application 100 as a usage information request for the printer 21A (S21). The printer driver 111 then drives the printer 21A based on this print command (S22). The printer 21A thus operates as controlled by the application 100.

The virtual counter 112 also interprets the print commands received from the application 100 and predicts usage values for specific items such as the number of characters and number of lines printed by the printer 21A (S23). These predicted counts are then sent to the data statistics object 150A for the group containing the printer 21A (S24). The data statistics object 150A separately accumulates and stores the reported counts (S25).

Figure 3:
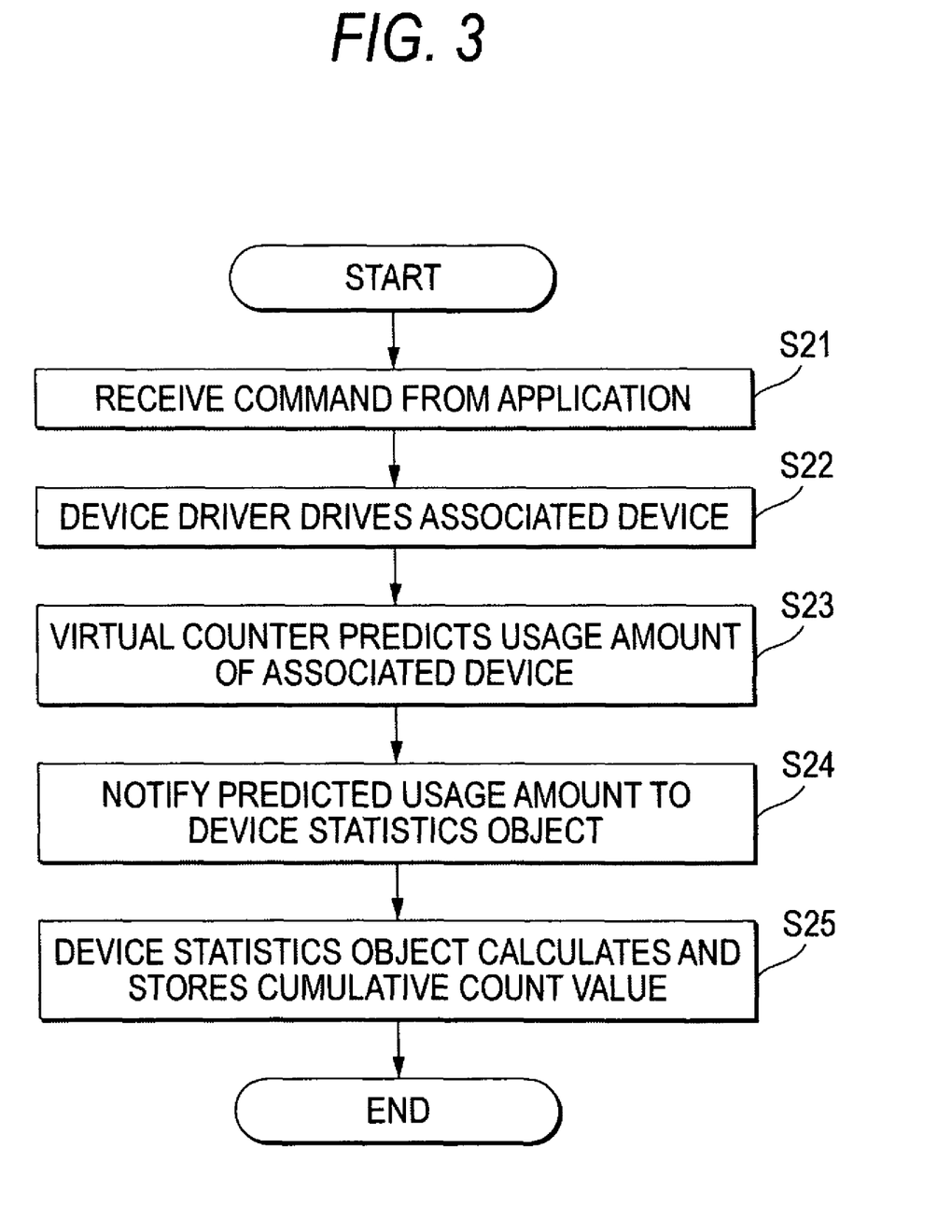
FIG. 3 is a flow chart of a process for predicting device usage executed in the POS system of FIG. 1.
Figure 4:
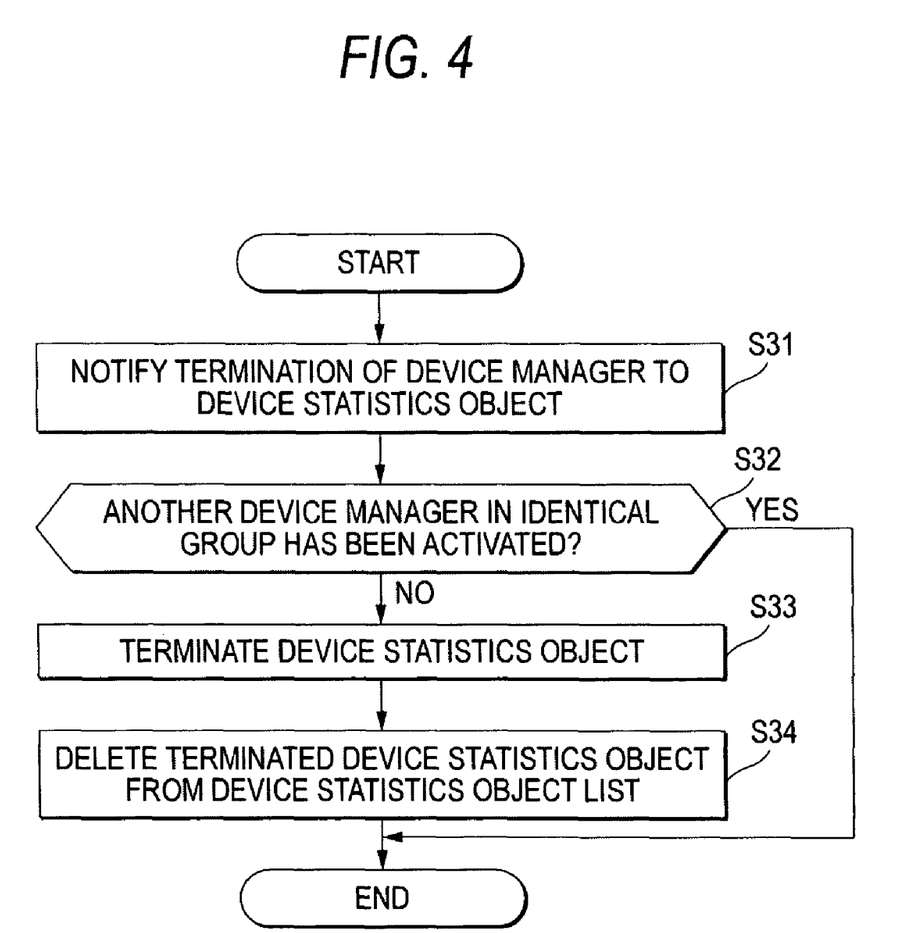
FIG. 4 is a flow chart of a process for terminating a data statistics object executed in the POS system of FIG. 1.

The MICR manager 12A and the scanner manager 13A also run the process shown in FIG. 3. The corresponding virtual counters 122, 132 likewise predict the usage counts for specified parameters of the MICR 22A and the scanner 23A, and report these counts to the data statistics object 150A. The data statistics object 150A also separately accumulates and stores these reported counts.

The application 100 can thus reference the data statistics object 150 that manages a particular group to acquire information about all of the devices belonging to that group and the overall operating time for the entire group. The data statistics objects in this embodiment thus enable the system to manage device statistics relating to the operation of respective devices in each of the groups.

A process for terminating a data statistics object 150 is described next with reference to the flow chart in FIG. 4.

If operation of one of the active device managers stops because the process ended or if a device manager is to be deleted, an appropriate message is sent to the data statistics object 150 (S31).

When the data statistics object 150 receives an end of operation report from a device manager, the data statistics object 150 determines if another device manager in the same group is still active (S32). If another device manager is still active (YES in S32), this process aborts.

However, if there is no other active device manager in the same group (S32 returns no), the data statistics object 150 terminates itself (S33) and sends a corresponding report to the object manager 15.

When the object manager 15 receives a report that a data statistics object 150 is terminated, the object manager 15 deletes the corresponding data statistics object record from the data statistics object list 151 (S34).

A data statistics object 150 stays alive as long as any device manager 11, 12, 13 associated with the group managed by the data statistics object 150 is still active. The data statistics object 150 is terminated when all device managers 11, 12, 13 in the managed group stop operating.

Figure 5:
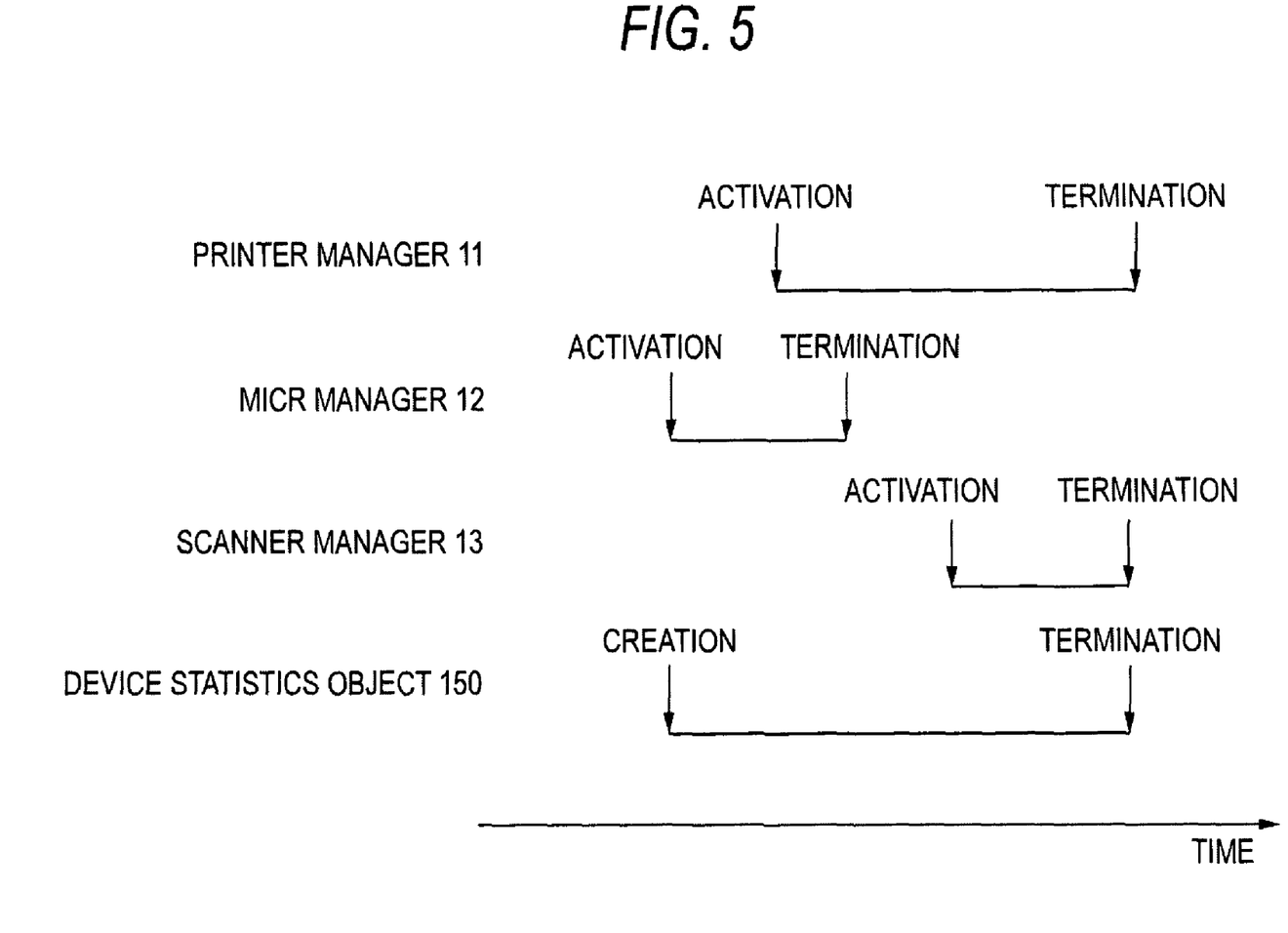
FIG. 5 is a timing chart showing a relationship between operation time periods of device managers in the POS system of FIG. 1 and an existing time period of the data statistics object.

Therefore, when the printer managers 11, the MICR managers 12, and the scanner manager 13 start and stop operation at the timings shown in FIG. 5, the data statistics object 150 is created when the device manager that is activated first, the MICR manager 12 in this example, starts operating, and lasts until the last operating device manager, the scanner manager 13 in this example, stops operating. As a result, the application 100 can determine how long the hybrid device 2A has been continuously operating by querying the data statistics object 150 to get the elapsed time since the data statistics object 150 is created.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A program-controlled device management apparatus adapted to be connected to a plurality of peripheral devices that are grouped into at least one device group, the device management apparatus comprising:
    an application program running in the device management apparatus;
    a plurality of device managers, each of which is associated with one of the peripheral devices and is operable to create usage information of the associated one of the peripheral devices;
    a device group manager, associated with a device group and coupled to the device managers that are associated with the peripheral devices of that device group to receive the usage information from each of the device managers, the device group manager being operable to generate usage information of the device group and to notify the usage information of the device group in response to an inquiry from the application program;
    a plurality of device drivers, each of which is associated with one of the peripheral devices and responsive to instructions from said application program to drive the associated one of the peripheral devices;
    a storage component storing device group information defining which of said peripheral devices belong to the at least one device group; and
    a creator component, operable to reference, when one of the device managers is activated, the device group information to identify the device group that includes that one of the peripheral devices that is associated with the activated one of the device managers;
    wherein the creator component is operable to dynamically create a device group manager if no device group manager is associated with the identified device group;
    wherein the creator component is operable to terminate the created device group manager when all the device managers associated with the peripheral devices belonging to the identified device group stop operating;
    wherein the device management apparatus is a POS terminal adapted to be connected to at least one hybrid device including at least two of the peripheral devices; and
    wherein the usage information created by each of the device managers includes information pertaining to each of the at least two peripheral devices, and the usage information generated by the device group manager includes information pertaining to the hybrid device.

2. The device management apparatus as set forth in claim 1, wherein each device manager is adapted to create the usage information in response to said application program instructing the device driver associated with the same device as said each device manager to drive that device.

3. The device management apparatus as set forth in claim 1, adapted to dynamically establish the association between the device managers and the peripheral devices.

4. The device management apparatus as set forth in claim 1, further comprising counters associated with the plurality of peripheral devices, the counters adapted to create the predictive usage counts based on drive instructions from said application program to said device drivers.

5. The device management apparatus as set forth in claim 4, further comprising a cumulative counter adapted to accumulate the predictive usage counts for each of the peripheral devices.

6. The device management apparatus as set forth in claim 1, wherein the usage information of the device group includes time elapsed since the device group manager is created.

7. A device management method, comprising:
    connecting a program-controlled device management apparatus to a plurality of peripheral devices that are grouped into at least one device group;
    running an application program in the device management apparatus;
    obtaining usage information of each of the peripheral devices;
    providing a plurality of device drivers, each of which is associated with one of the peripheral devices and responsive to instructions from said application program to drive the associated one of the peripheral devices;
    storing device group information defining which of said peripheral devices belong to the at least one device group;
    referencing, when one of the device managers is activated, the device group information to identify the device group that includes that one of the peripheral devices that is associated with the activated one of the device drivers;
    if no device group manager is associated with the identified device group, creating dynamically a device group manager associated with that device group to receive said usage information and generate usage information of the device group based on the usage information of each of the peripheral devices, and to notify the usage information of the device group to the device management apparatus in response to an inquiry from the application program; and terminating the created device group manager when all the device managers associated with the peripheral devices belonging to the identified device group stop operating, wherein the device management apparatus is a POS terminal adapted to be connected to at least one hybrid device including at least two of the peripheral devices, and wherein the usage information created by each of the device managers includes information pertaining to each of the at least two peripheral devices, and the usage information generated by the device group manager includes information pertaining to the hybrid device.

8. The device management method as set forth in claim 7, wherein the usage information is created when the application program instructs a device driver to drive the associated devices.

* * * * *